United States Patent
Uno (10) Patent No.: US 8,232,780 B2
(45) Date of Patent: Jul. 31, 2012

(54) POWER FACTOR CORRECTION CONVERTER

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/295,179

(22) Filed: Nov. 14, 2011

(65) Prior Publication Data

US 2012/0057382 A1 Mar. 8, 2012

Related U.S. Application Data

(63) Continuation of application No. PCT/JP2010/050667, filed on Jan. 21, 2010.

(30) Foreign Application Priority Data

May 15, 2009 (JP) ................................ 2009-119028

(51) Int. Cl.
*G05F 1/10* (2006.01)
*H02M 5/42* (2006.01)

(52) U.S. Cl. ........... 323/222; 323/285; 363/81; 363/125

(58) Field of Classification Search .................. 323/222, 323/282–285, 290, 351; 363/81, 82, 125
See application file for complete search history.

(56) References Cited

U.S. PATENT DOCUMENTS

| | | | |
|---|---|---|---|
| 6,259,613 B1 * | 7/2001 | Lee et al. .................... | 363/89 |
| 7,148,664 B2 * | 12/2006 | Takahashi et al. .......... | 323/222 |
| 7,359,224 B2 * | 4/2008 | Li ............................. | 363/89 |
| 7,919,950 B2 * | 4/2011 | Uno et al. ................... | 323/207 |
| 8,076,919 B2 * | 12/2011 | Liu et al. .................... | 323/285 |
| 2004/0178784 A1 | 9/2004 | Okamoto | |
| 2007/0103949 A1 | 5/2007 | Tsuruya | |
| 2011/0211377 A1 * | 9/2011 | Uno .............................. | 363/124 |
| 2011/0216558 A1 | 9/2011 | Uno | |

FOREIGN PATENT DOCUMENTS

| | | |
|---|---|---|
| EP | 0 637 789 A1 | 2/1995 |
| EP | 0 991 169 A2 | 4/2000 |
| EP | 2 166 657 A1 | 3/2010 |
| EP | 2 173 025 A1 | 4/2010 |

(Continued)

OTHER PUBLICATIONS

Official Communication issued in International Patent Application No. PCT/JP2010/050667, mailed on Mar. 9, 2010.

*Primary Examiner* — Jessica Han
(74) *Attorney, Agent, or Firm* — Keating & Bennett, LLP (57) ABSTRACT

A switching control circuit includes an A/D converter that converts detection signals of an input voltage detection circuit, a current detection resistor, and an output voltage detection circuit into a digital signal, a D/A converter that provides a reference voltage to an analog comparator, a PWM circuit that outputs a control voltage to a switching element, and a CPU that provides a specified value to the D/A converter as a reference value, reads the values converted by the A/D converter, and obtains the average value of the inductor current. The CPU reads an inductor current Ib when the output of the PWM circuit is set at a high level, and obtains the average value of an inductor current peak value Ip determined by the specified value and the inductor current value Ib at turn-on as an average inductor current value ILav.

8 Claims, 7 Drawing Sheets

FOREIGN PATENT DOCUMENTS

| | | |
|---|---|---|
| JP | 07-177746 A | 7/1995 |
| JP | 10-075570 A | 3/1998 |
| JP | 2000-116133 A | 4/2000 |
| JP | 2000-232789 A | 8/2000 |
| JP | 2004-282958 A | 10/2004 |
| JP | 2004-297943 A | 10/2004 |
| JP | 2005-020994 A | 1/2005 |
| JP | 2006-067730 A | 3/2006 |
| JP | 2007-288892 A | 11/2007 |
| WO | 2009/004847 A1 | 1/2009 |
| WO | 2009/008197 A1 | 1/2009 |
| WO | 2010/061652 A1 | 6/2010 |
| WO | 2010/061654 A1 | 6/2010 |

\* cited by examiner

POWER FACTOR CORRECTION CONVERTER

BACKGROUND OF THE INVENTION

1. Field of the Invention

The present invention relates to an AC-DC converter that receives an alternating-current voltage and outputs a direct-current voltage. In particular, the present invention relates to a PFC converter that improves the power factor.

2. Description of the Related Art

Japan, Europe, and so on have exercised harmonic current regulations where apparatuses are classified depending on the application, input power, and the like. To address these regulations, there has been carried out an idea that a circuit called a PFC (power factor correction) converter is added to the power supply of a general home electrical appliance to which the regulations apply, so as to suppress harmonic currents.

A general switching power supply apparatus using a commercial alternating-current power supply as an input power supply rectifies and smoothes a commercial alternating-current power supply to convert it into a direct-current voltage and then switches the direct-current voltage in a DC-DC converter. Thus, the input current becomes discontinuous and distorted from a sine wave, resulting in harmonic currents.

To suppress such harmonic currents, a PFC converter is provided after a full-wave rectifier circuit and before a smoothing circuit composed of a smoothing capacitor.

This PFC converter is composed of a chopping circuit and operates so that the waveform of the input current has a shape similar to the waveform of the input voltage, that is, the waveform of the input has an in-phase sinusoidal shape. Thus, harmonic currents are suppressed to a certain level or below.

Hereafter, an example configuration of the PFC converter shown in Japanese Unexamined Patent Application Publication No. 2004-282958 will be described on the basis of FIG. 1.

Figure 1:
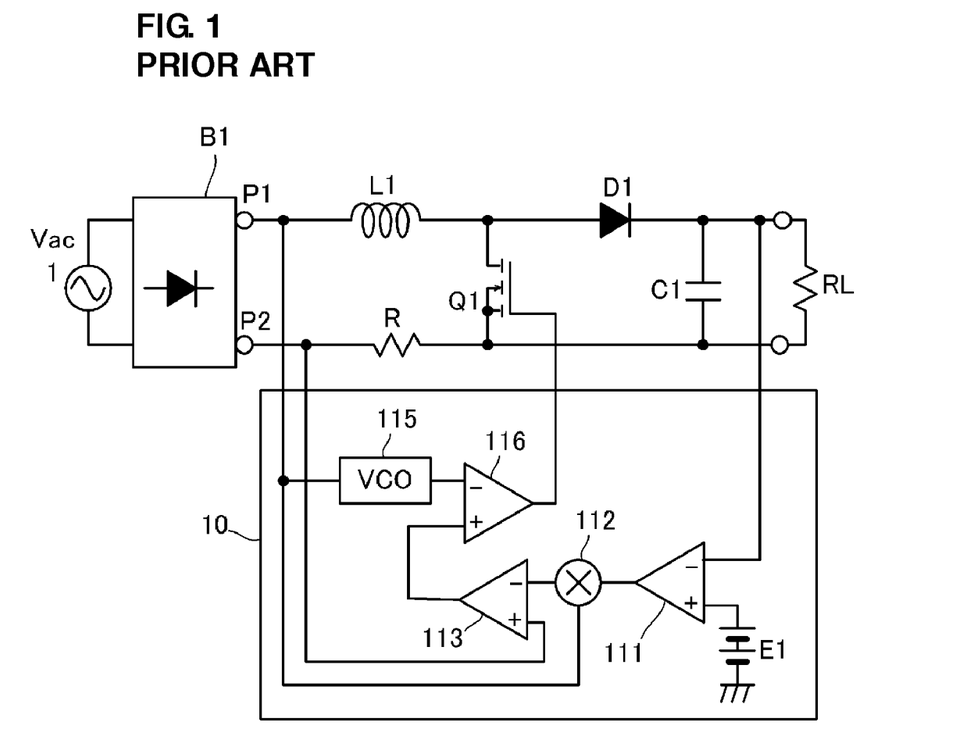
FIG. 1 is a diagram showing an example configuration of the PFC converter shown in Japanese Unexamined Patent Application Publication No. 2004-282958.

In a power factor correction circuit shown in FIG. 1, a series circuit composed of a switching element Q1 and a current detection resistor R is connected to both output terminals of a diode bridge B1, which rectifies the alternating-current voltage of an alternating-current power supply Vac. The switching element Q1 is composed of a boosting reactor L1 and a MOSFET. A series circuit composed of a diode D1 and a smoothing capacitor C1 is connected to both end portions of the switching element Q1, and a load RL is connected to both end portions of the smoothing capacitor C1. The switching element Q1 is configured to be turned on or off under the PWM control of a control circuit 10. The current detection resistor R detects an input current flowing into the diode bridge B1.

The control circuit 10 includes an error amplifier 11, a multiplier 111, an error amplifier 113, a voltage control oscillator (VCO) 115, and a PWM comparator 116.

The error amplifier 111 obtains the error between the voltage of the smoothing capacitor C1 and a reference voltage E1. The multiplier 112 multiplies the error voltage signal by the voltage rectified by the diode bridge B1. The error amplifier 113 generates an error between the result of the multiplication performed by the multiplier 112 and the current signal flowing into the diode bridge B1, and outputs the error to the PWM comparator 116.

The VOC 115 generates a chopping signal with a frequency corresponding to the rectified voltage value of the alternating-current power supply voltage.

The PWM comparator 116 receives the chopping signal from the VCO 115 via the − terminal thereof, as well as receives the signal from the error amplifier 113 via the + terminal thereof. That is, the PWM comparator 116 provides, to the switching element Q1, a duty pulse corresponding to the current flowing into the diode bridge B1 and the output voltage of the diode bridge B1. This duty pulse is a pulse width control signal that compensates for variations in the alternating-current power supply voltage and the direct-current load voltage continuously in a certain period. Such a configuration performs control so that the current waveform of the alternating-current power supply matches the voltage waveform of the alternating-current power supply, improving the power factor.

Japanese Unexamined Patent Application Publication No. 7-177746 discloses a PFC converter that performs digital control.

Also in the case of digital control, current flowing into the inductor is detected, and the switching element is switched under PWM control corresponding to the value of the detected current.

As described above, a PFC converter is basically required to detect current passing through an inductor (hereafter referred to as "the inductor current") in order to make the shape of the input current similar to the waveform of the input voltage.

Typical current detection methods include the following methods:

(1) Insertion of a current detection resistor into the current path in series to detect a fall voltage generated at both end portions of the resistor;

(2) Detection of current by insertion of a current transformer into the current path or by use of a current transformer having an inductor on its primary side; and (3) Disposition of a Hall sensor on the current path to detect the output voltage.

In the above-mentioned method (1) using a current detection resistor, power consumption in the current detection resistor constitutes an equivalent loss. This is a problem in terms of loss reduction. In the method (2) using a current transformer, the direct-current components of current to be detected are cut off. Thus, only the alternating-current components of the current can be detected and the direct-current components (DC offset) thereof cannot be detected. Detecting each current using a current transformer to synthesize a signal allows detection of the inductor current; however, two current transformers are required in this case. The method (3) using a Hall sensor does not cause the problems with the above-mentioned methods (1) and (2); however, it is disadvantageous in that the cost as a whole is increased since the sensor is expensive.

Particularly, in a case where an AD converter is used in a digital-control PFC in order to detect current, as in the PFC converter according to Japanese Unexamined Patent Application Publication No. 7-177746, it is difficult to continue obtaining the value continuously, owing to the clock, the sample hold time, the number of resistors, and the like. This makes it difficult to obtain the average value from the inductor current containing a ripple. Moreover, elimination of a ripple using a filter involves insertion of the filter into the control loop system, resulting in the degradation of responsiveness.

SUMMARY OF THE INVENTION

Accordingly, preferred embodiments of the present invention provide a PFC converter that effectively controls average current and that is low-cost and highly responsive.

A PFC converter according to a preferred embodiment of the present invention includes a rectifier circuit that rectifies an alternating-current voltage received from an alternating-current power supply; a series circuit that is connected to the subsequent stage of the rectifier circuit and includes an inductor and a switching element; a rectifying and smoothing circuit connected to the switching element in parallel; an input voltage detection circuit provided subsequent to the rectifier circuit; an inductor current detection circuit that detects current flowing into the inductor; an output voltage detection circuit provided subsequent to the rectifying and smoothing circuit; and a switching control circuit that on/off controls the switching element on the basis of results of detection performed by the input voltage detection circuit, the inductor current detection circuit, and the output voltage detection circuit so that an input current received from the alternating-current power supply has a shape similar to the shape of the alternating-current voltage. The PFC converter according to the present preferred embodiment preferably has a first configuration or a second configuration described in more detail below.

In the first configuration, the PFC converter includes an analog comparator that inverts an output thereof when an inductor current reaches a specified value after the switching element is turned on.

The switching control circuit turns off the switching element when the output of the analog comparator is inverted, obtains an inductor current value at turn-on of the switching element by sampling, and obtains an average inductor current value by performing an operation on the basis of an inductor current value at turn-off of the switching element determined by the specified value and the inductor current value at turn-on.

For example, the value obtained according to the formula below is detected as the average current value of the inductor current, that is, as the average value of the input current.

$$ILav=(Ip+Ib)/2$$

where Ip represents a current peak value determined by the specified value, Ib represents a current value obtained by sampling a current detection signal generated by the inductor current detection circuit immediately after the switching element is turned on, and ILav represents the average value of current flowing into the inductor.

This substantially allows detection of the average value of the input current into the PFC converter.

In the second configuration, the PFC converter includes an analog comparator that detects that an inductor current has reached a specified value after the switching element is turned on.

The switching control circuit turns off the switching element when the output of the analog comparator is inverted, includes a timer that counts the time (Ton) from turn-on of the switching element to turn-off thereof, detects an on time (Ton) during which the switching element is on, from a count value of the timer or calculates an off time (Toff) during which the switching element is off, and obtains an average inductor current value on the basis of the input voltage, the output voltage, inductance of the inductor, and one of the on time (Ton) and the off time (Toff), the inductor current value at turn-off being determined by the specified value.

For example, the value obtained according to the formulas below is detected as the average current value of the inductor current, that is, as the average value of the input current.

$$ILav=Ip-vi/L \times Ton/2 \text{ or}$$

$$ILav=Ip-\{(vo-vi)/L\}\times Toff/2$$

where Ip represents a current peak value determined by the specified value, vi represents an input voltage received from the alternating-current power supply, vo represents an output voltage, L represents the inductance value of the inductor, Ton represents an on time during which the switching element is on, Toff represents an off time during which the switching element is off, and ILav represents the average value of current flowing into the inductor.

This substantially allows detection of the average value of the input current into the PFC converter.

The inductor current detection circuit is connected to the switching element in series.

Thus, the inductor current is detected using the current flowing into the switching element, reducing elements or loss.

According to another preferred embodiment of the present invention, a PFC converter including a first series circuit that is connected to a load in parallel and includes a first switching element and a first rectifying element; an inductor connected between the connection between the first switching element and the first rectifying element and a first input terminal of an alternating-current power supply; a second series circuit that is connected to a load in parallel and includes a second switching element and a second rectifying element, the connection between the second switching element and the second rectifying element being connected to a second input terminal of the alternating-current power supply; a smoothing circuit connected to a load in parallel; an inductor current detection circuit that substantially detects current flowing into the inductor; and a switching control circuit that on/off controls the first and second switching elements so that an average value of an input current received from the alternating-current power supply has a shape similar to the shape of an alternating-current voltage of the alternating-current power supply. The PFC converter according to the present preferred embodiment preferably has a third configuration or a fourth configuration described in more detail below.

In the third configuration, the PFC converter includes an analog comparator that inverts an output thereof when an inductor current reaches a specified value after one of the first and second switching elements is turned on.

The switching control circuit turns off the switching element when the output of the analog comparator is inverted and obtains an average inductor current value on the basis of an inductor current value at turn-on of the switching element and an inductor current value at turn-off thereof.

This substantially allows detection of the average value of the input current into the PFC converter.

In the fourth configuration, the PFC converter includes an analog comparator that detects that an inductor current has reached a specified value after one of the first and second switching elements is turned on.

The switching control circuit turns off the switching element when the output of the analog comparator is inverted, includes a timer that counts the time (Ton) from turn-on of the switching element to turn-off thereof, detects an on time (Ton) during which the switching element is on, from a count value of the timer or calculates an off time (Toff) during which the switching element is off, and obtains an average inductor current value on the basis of the input voltage, the output voltage, inductance of the inductor, and one of the on time (Ton) and the off time (Toff).

This substantially allows detection of the average value of the input current into the PFC converter.

The switching control circuit preferably includes an A/D converter that converts detection signals of the input voltage detection circuit, the inductor current detection circuit, and the output voltage detection circuit into a digital value, a D/A converter that provides a reference voltage to the analog comparator, a PWM circuit that outputs a control voltage to the switching element, and a CPU that provides, to the D/A converter, the specified value corresponding to the reference value and obtains the average value of the inductor current on the basis of the values converted by the A/D converter.

Various preferred embodiments of the present invention achieve the following advantages.

It is sufficient to calculate the average value of the inductor current on the basis of a sampling value only once for each switching. This eliminates the need for a high-performance A/D converter, as well as reduces the load imposed on the operation processing unit such as the CPU. Thus, a DSP or other suitable device having a relatively low processing capability can be used, resulting in a reduction in the overall cost.

There is no need for a filter for detecting the average value of the inductor current, preventing the filter from deteriorating responsiveness.

Since the inductor current is detected using the current flowing into the switching element, the number of required components and loss are reduced.

Since turn-off of the switching element is processed by the analog comparator in real time, high responsiveness is obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A-4C are diagrams showing the waveform of current and voltage in the PFC converter 101 in a switching period, wherein

DETAILED DESCRIPTION OF THE PREFERRED EMBODIMENTS

First Preferred Embodiment

A PFC converter according to a first preferred embodiment will be described with reference to FIGS. 2 to 4C.

Figure 2:
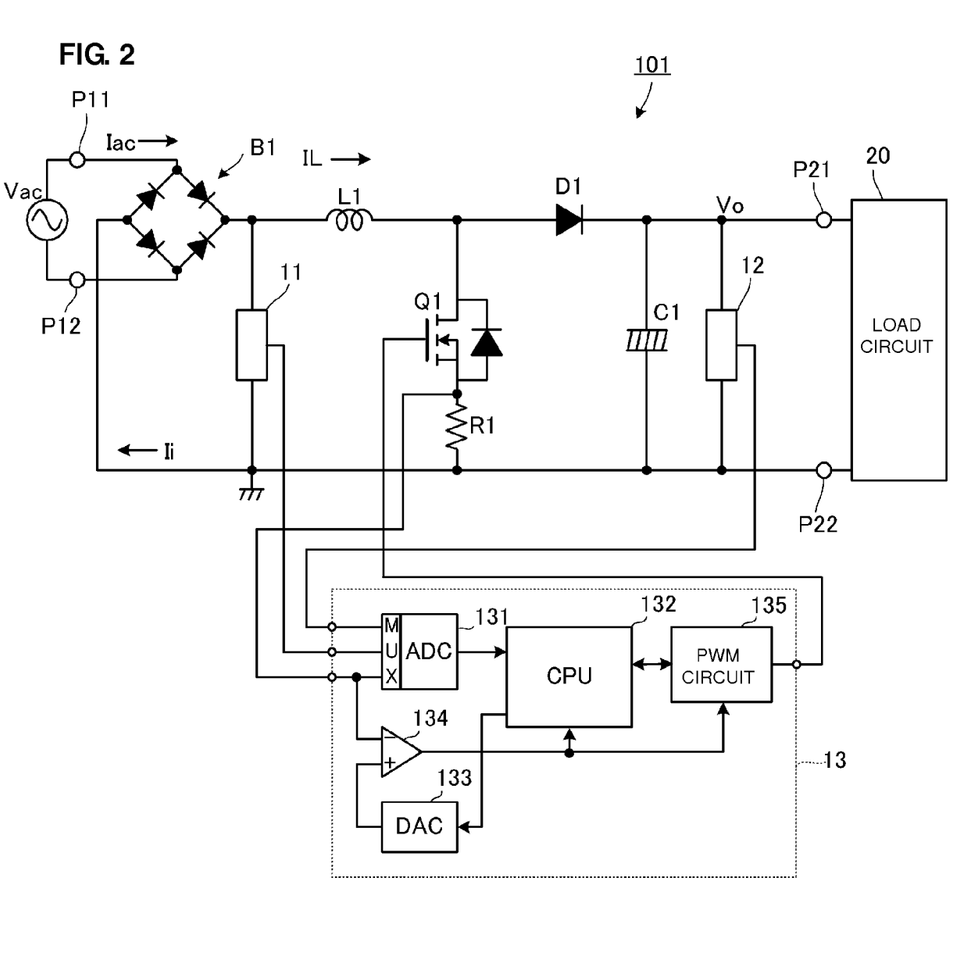
FIG. 2 is a circuit diagram of a PFC converter 101 according to a first preferred embodiment of the present invention.

FIG. 2 is a circuit diagram of a PFC converter 101 according to the first preferred embodiment. In FIG. 2, reference numerals P11 and P12 are the input ports of the PFC converter 101, and reference numerals P21 and P22 are the output ports of the PFC converter 101. An alternating-current power supply Vac, which is a commercial alternating-current power supply, is inputted into the input ports P11 to P12. A load circuit 20 is connected to the output ports P21 to P22.

The load circuit 20 is, for example, a circuit including a DC-DC converter and an electronic device that receives power supplied by the DC-DC converter.

A diode bridge B1, which full-wave rectifies the alternating-current voltage of the alternating-current power supply Vac, is provided in the input stage of the PFC converter 101. A series circuit including an inductor L1 and a switching element Q1 is connected to the output side of the diode bridge B1. A current detection resistor R1 is connected to the switching element Q1 in series. A rectifying and smoothing circuit including a diode D1 and a smoothing capacitor C1 is connected in parallel with both end portions of a series circuit including the switching element Q1 and the current detection resistor R1. The inductor L1, the switching element Q1, the diode D1, and the smoothing capacitor C1 to define a so-called boost chopper circuit.

An input voltage detection circuit 11 is provided between both end portions of the output side of the diode bridge B1. An output voltage detection circuit 12 is provided between the output ports P21 to P22.

A switching control circuit 13 includes an A/D converter 131 that converts detection signals of the input voltage detection circuit 11, the current detection resistor R1, and the output voltage detection circuit 12 into a digital signal, a D/A converter 133 that provides a reference voltage to an analog comparator 134, a PWM circuit 135 that outputs a control voltage to the switching element Q1, and a CPU 132 that reads the values converted by the A/D converter 131, provides a specified value to the D/A converter 133 as the reference value, and controls the PWM circuit 135 to change the output control voltage.

As will be described later, the switching control circuit 13 on/off controls the switching element Q1 on the basis of the detection signals of the input voltage detection circuit 11, the current detection resistor R1, and the output voltage detection circuit 12 so that an input current Iac received from the alternating-current power supply Vac has a shape similar to that of the voltage of the alternating-current power supply Vac.

Figure 3:
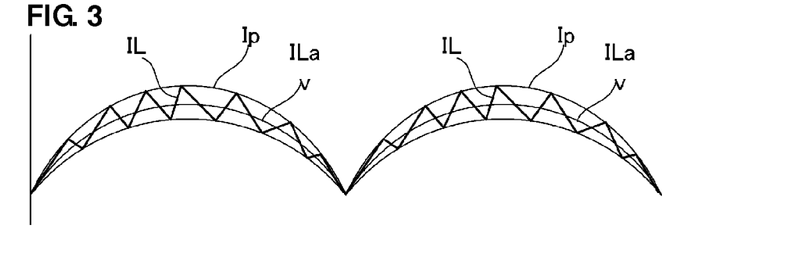
FIG. 3 is the waveform in one period, of current supplied by an alternating-current power supply for the PFC converter 101, in the switching control circuit 13.

FIG. 3 is the waveform in one period, of current supplied by the alternating-current power supply for the PFC converter 101, inside the switching control circuit 13. This example is a waveform diagram in current continuous mode. A waveform IL is the waveform of current flowing into an inductor L1 in the PFC converter 101 shown in FIG. 2. Ip is an envelope of its peak value (peak current), and ILav is an envelope of the average value (average current). For graphical reasons, the diagram shows a case where the switching frequency of the PFC converter 101 is extremely reduced, that is, the diagram is shown at a frequency such that the waveform of current flowing into the inductor L1 appears to be a chopping wave.

Figure 4A:
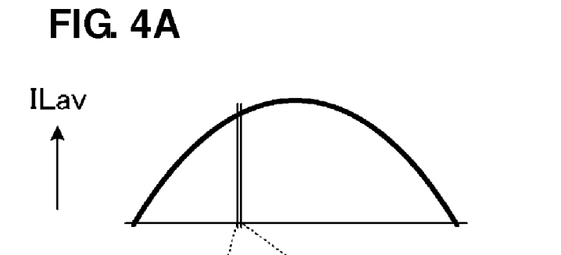
FIG. 4A is the current waveform of the average value ILav of current flowing into an inductor L1 in a half period of a commercial power supply frequency.
Figure 4B:
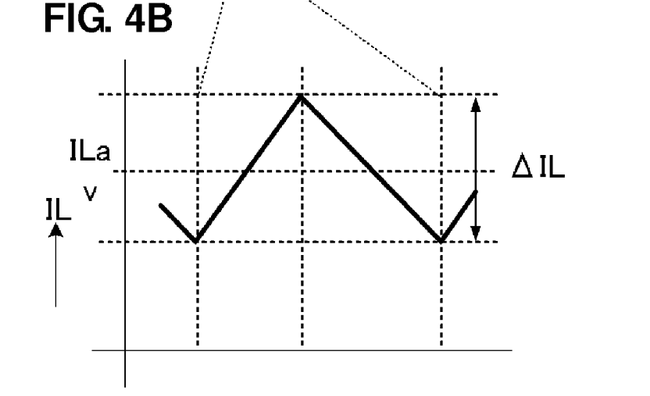
FIG. 4B is a diagram showing the waveform of current IL flowing into the inductor L1 in a switching period where the time axis is partially expanded.
Figure 4C:
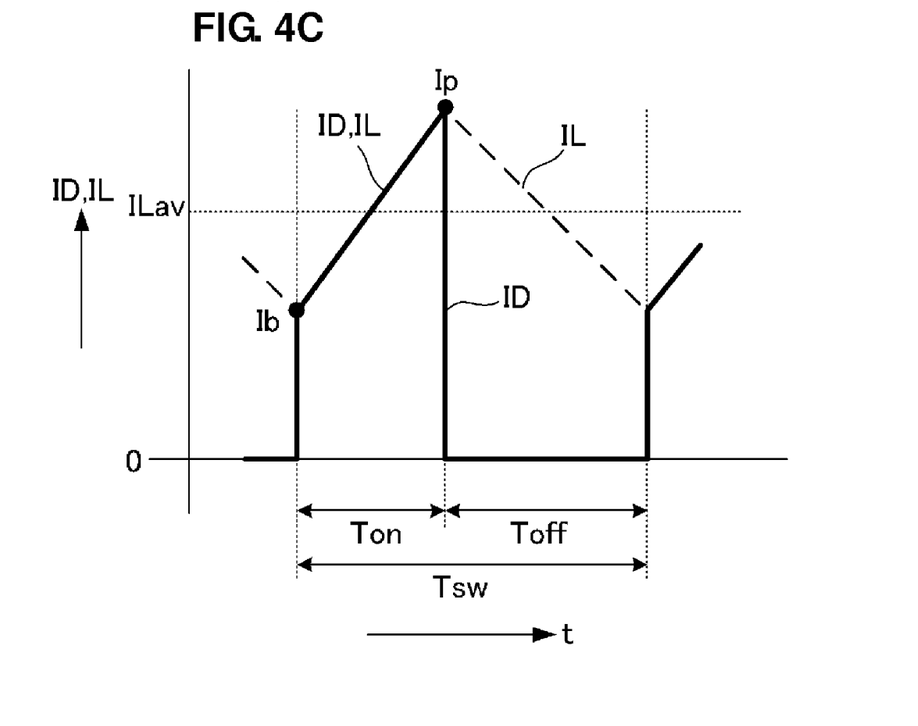
FIG. 4C is a diagram showing the waveforms of the inductor current IL and a drain current ID of a switching element Q1.

FIGS. 4A-4C are waveform diagrams of the voltage and current of the PFC converter 101 in a switching period in a state where control is being performed in continuous current mode. The switching control circuit 13 performs switching control so that the average value of current inputted into the PFC converter 101, that is, the average value of current flowing into the inductor L1 has a shape similar to the full-wave rectified waveform. The flow of the input current having a shape similar to that of the input voltage suppresses harmonics and improves the power factor.

FIG. 4A is the current waveform of the average value ILav of current flowing into the inductor L1 in a half period of a commercial power supply frequency; FIG. 4B is the waveform diagram of the current IL flowing into the inductor L1 in a switching period where the time axis is partially expanded; and FIG. 4C is a diagram showing the waveforms of the inductor current IL and the drain current ID of the switching element Q1.

The operation of the PFC converter 101 shown in FIG. 2 and, in particular, the operation of the switching control circuit 13 will be described with reference to FIG. 4C.

First, the PWM circuit 135 sets the output port at a high level in a certain period. The setting of the output port of the PWM circuit 135 at a high level turns on the switching element Q1 so that the inductor current flows into the switching element Q1. At this timing, the A/D converter 131 reads the digital value of the fall voltage of the current detection resistor R1. This digital value corresponds to a turn-on drain current (turn-on inductor current) Ib.

The CPU 132 outputs a predetermined specified value to the D/A converter 133. Thus, the reference voltage of the analog comparator 134 becomes a voltage corresponding to the specified value. Since the fall voltage of the current detection resistor R1 is inputted into the analog comparator 134, the output voltage of the analog comparator 134 is inverted when the fall voltage of the current detection resistor R1 exceeds the reference voltage.

The inversion of the output voltage of the analog comparator 134 sets the output port of the PWM circuit 135 at a low level, thereby turning off the switching element Q1.

Since the switching element Q1 is turned off as described above, the specified value corresponds to the current value at the turn-off timing, that is, the specified value corresponds to a peak value Ip of the drain current (inductor current).

The CPU 132 obtains the average value ILav of the inductor current by using the following formula.

$$ILav=(Ib+Ip)/2 \quad (1)$$

That is, the average value of the above-mentioned current values Ib and Ip is obtained as the average value ILav of the inductor current. The CPU 132 PWM controls the switching element Q1 by operating the specified value so that the average value ILav of the inductor current has a shape similar to that of the voltage of the alternating-current power supply.

The preferred embodiment shown above is configured so that the inductor current is detected using the fall voltage of the current detection resistor connected to the switching element in series. This prevents power consumption in the current detection resistor during an off time, reducing loss. Use of a current transformer in the same way also allows detection of the inductor current without cutting off the direct-current components.

Second Preferred Embodiment

Figure 5:
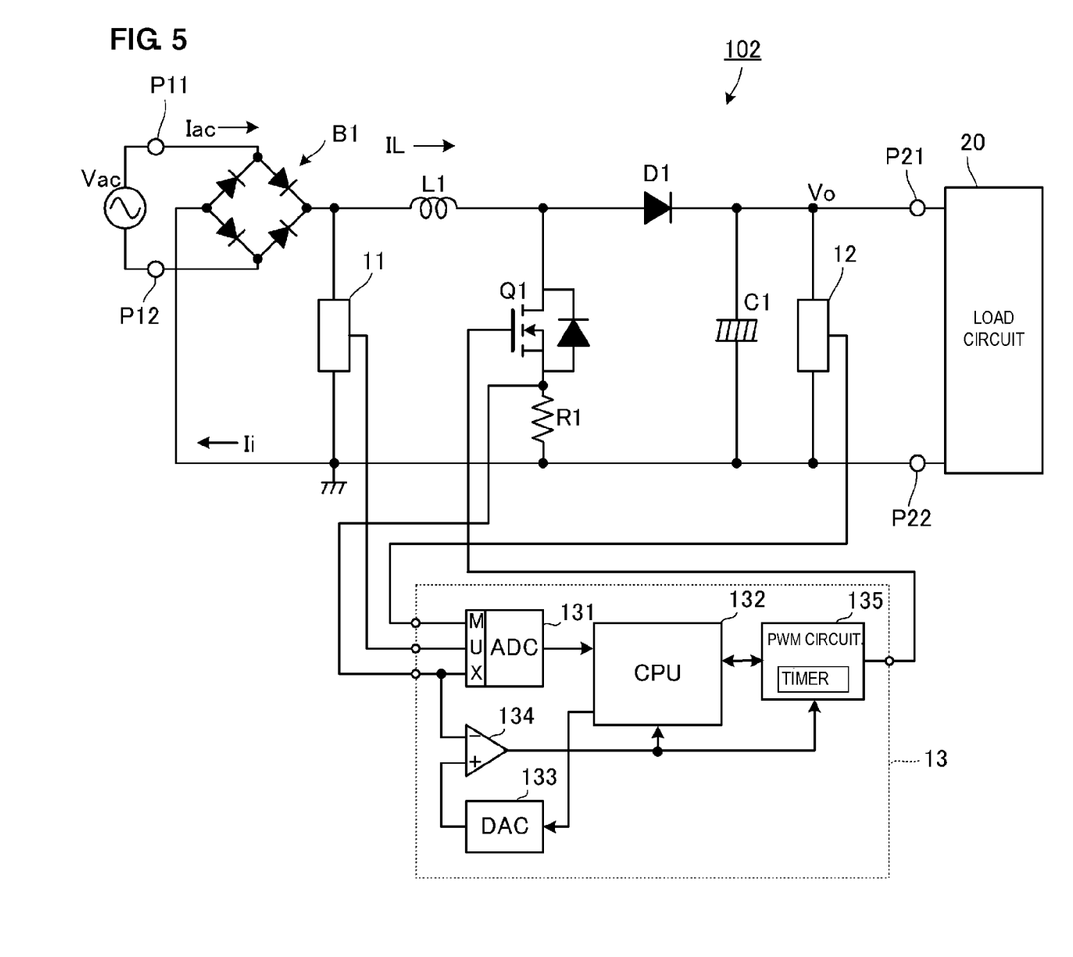
FIG. 5 is a circuit diagram of a PFC converter 102 according to a second preferred embodiment of the present invention.

FIG. 5 is a circuit diagram of a PFC converter 102 according to a second preferred embodiment. The PFC converter 102 differs from the PFC converter 101 according to the first preferred embodiment shown in FIG. 2 in that a PWM circuit 135 within a switching control circuit 13 includes a timer readable by a CPU 132. The other configuration is the same as what is shown in FIG. 2.

Hereafter, the operation of the PFC converter 102 shown in FIG. 5 and, in particular, the operation of the switching control circuit 13 will be described with reference to FIG. 6.

Figure 6:
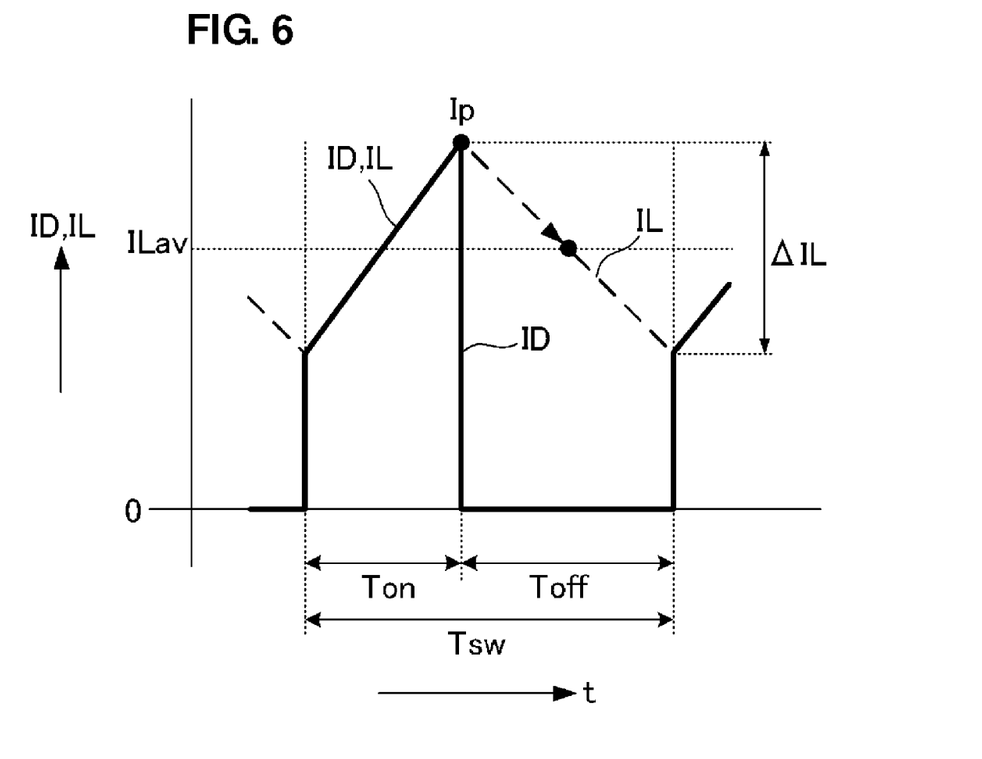
FIG. 6 is a diagram showing the waveforms of an inductor current IL and a drain current ID of a switching element Q1.

FIG. 6 is a diagram showing the waveforms of an inductor current IL and a drain current ID of a switching element Q1.

The timer within the PWM circuit 135 counts the clock in a certain period. This counting is repeated. Each time the initial value is restored when the full count is reached, the output port is set at a high level. Accordingly, the output port of the PWM circuit 135 is set at a high level in a certain period.

The setting of the output port of the PWM circuit 135 at a high level turns on the switching element Q1 so that the inductor current flows into the switching element Q1. The inductor current rises at an inclination determined by (Vi/L) where L represents the inductance of an inductor L1 and vi represents the input voltage.

The CPU 132 outputs a predetermined specified value to a D/A converter 133. Thus, the reference voltage of an analog comparator 134 becomes a voltage corresponding to the specified value. Since the fall voltage of a current detection resistor R1 is inputted into the analog comparator 134, the output voltage of the analog comparator 134 is inverted when the fall voltage of the current detection resistor R1 exceeds the reference voltage.

Since the turn-off operation occurs as described above, the specified value corresponds to the current value at the turn-off timing, that is, the specified value corresponds to a peak value Ip of the drain current (inductor current).

Moreover, when the output voltage of the analog comparator 134 is inverted, the CPU 132 reads the count value of the timer within the PWM circuit 135.

The timer is a timer that counts a value corresponding to the time which has elapsed since the setting of the output port of the PWM circuit 135 at a high level. Reading of the count value of the timer allows knowledge of an on time Ton shown in FIG. 6. Since a switching period Tsw is known, an off time Toff is obtained by subtracting the Ton from the Tsw.

On the other hand, during the off time Toff, the inductor current decreases at an inclination determined by (vo−vi)/L where L represents the inductance of the inductor L1, vi represents the input voltage, and vo represents the output voltage. A variation width ΔIL of the inductor current during the off time Toff is $\{(vo-vi)/L\} \times Toff$.

Accordingly, the average value ILav of the inductor current is obtained by using the formula below.

$$ILav=Ip-\{(vo-vi)/L\} \times Toff/2 \quad (2)$$

Use of Formula (3) below instead of Formula (2) also allows ILav to be obtained.

$$ILav=Ip-vi/L \times Ton/2 \quad (3)$$

Third Preferred Embodiment

Figure 7:
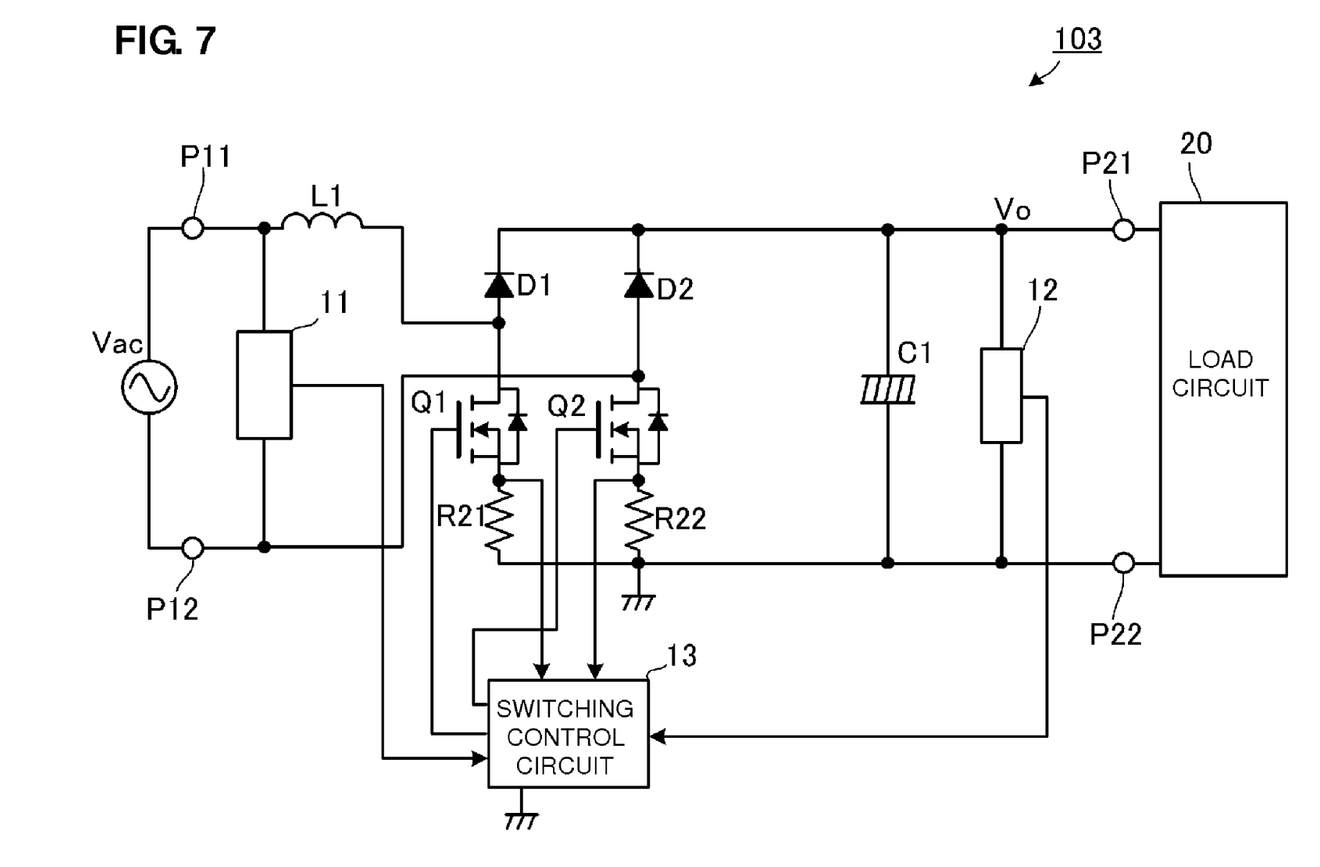
FIG. 7 is a circuit diagram of a PFC converter 103 according to a third preferred embodiment of the present invention.

FIG. 7 is a circuit diagram of a PFC converter 103 according to a third preferred embodiment. FIGS. 8A-8D are diagrams showing the current paths of the PFC converter 103 at four timings.

The PFC converter 103 shown in FIG. 7 is a diode bridge-less PFC converter that includes no diode bridge and includes an inductor and two switching elements.

In FIG. 7, reference numerals P11 and P12 are the input ports of the PFC converter 103, and reference numerals P21 and P22 are the output ports thereof. An alternating-current power supply Vac, which is a commercial alternating-current power supply, is inputted into the input ports P11 to P12. A load circuit 20 is connected to the output ports P21 to P22.

The load circuit 20 is, for example, a circuit including a DC-DC converter and an electronic device that receives power supplied by the DC-DC converter.

An input voltage detection circuit 11 is provided in the input stage of the PFC converter 103. An inductor L1 is connected to one line of the input voltage detection circuit 11 in series. A bridge circuit including diodes D1 and D2 and switching elements Q1 and Q2 is connected to the latter stage of the inductor L1. Current detection resistors R21 and R22 are connected between the sources of the switching elements Q1 and Q2 and a ground. A smoothing circuit including a smoothing capacitor C1 is connected to the output of the bridge circuit in parallel.

Figure 8A:
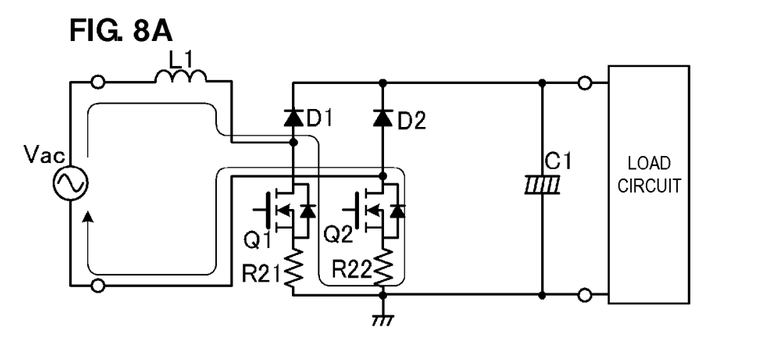
FIGS. 8A-8D are diagrams showing the current paths of the PFC converter 103 at four timings.
Figure 8B:
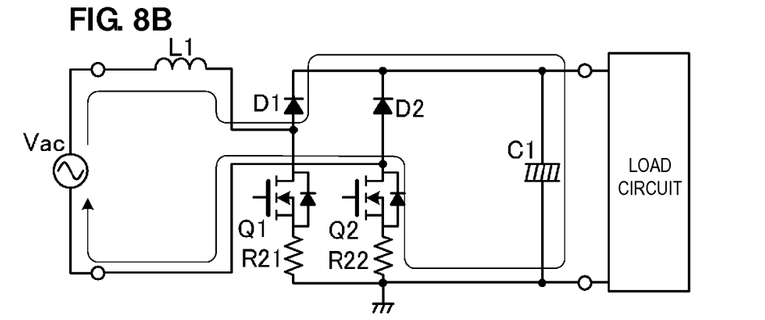

FIG. 8A is the current path at the time when both the switching elements Q1 and Q2 are on during a positive half cycle of the alternating-current power supply, and FIG. 8B is the current path at the time when both the switching elements Q1 and Q2 are off during a positive half cycle of the alternating-current power supply.

Figure 8C:
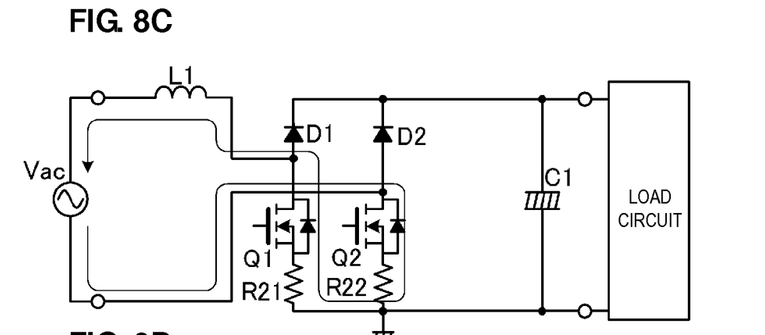
Figure 8D:
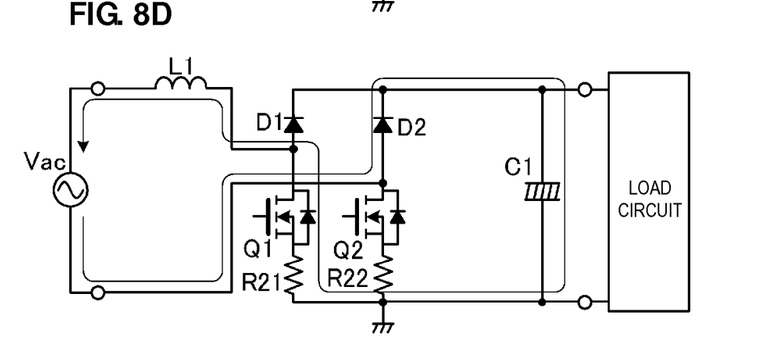

FIG. 8C is the current path at the time when both the switching elements Q1 and Q2 are on during a negative half cycle of the alternating-current power supply, and FIG. 8D is a current path at the time when both the switching elements Q1 and Q2 are off during a negative half cycle of the alternating-current power supply.

When the Q1 and Q2 are on during a positive half cycle of the alternating-current power supply, current passes through the path shown in FIG. 8A so that excitation energy is accumulated in the inductor L1. When the Q1 and Q2 are off during a positive half cycle of the alternating-current power supply, current passes through the path shown in FIG. 8B so that excitation energy is released from the inductor L1. At these times, the current passes through the parasitic diode of the Q2. Similarly, when the Q1 and Q2 are on during a negative half cycle of the alternating-current power supply, current passes through the path shown in FIG. 8C so that excitation energy is accumulated in the inductor L1. When the Q1 and Q2 are off during a negative half cycle of the alternating-current power supply, excitation energy is released from the inductor L1 at the timing shown in FIG. 8D. At these times, the current passes through the parasitic diode of the Q1.

A current detection resistor R21 is provided in order to detect current flowing into the inductor L1 when the Q1 is on during a positive half cycle of the alternating-current power supply. A current detection resistor R22 is provided in order to detect current flowing into the inductor L1 when the Q2 is on during a negative half cycle of the alternating-current power supply. The switching control circuit 13 shown in FIG. 7 obtains the average value of the inductor current using the method described in the first preferred embodiment or in the second preferred embodiment.

As shown in FIG. 4C, in a case where the same method as in the first preferred embodiment is used, the drain current (inductor current) Ib of the switching element Q1 or switching element Q2 is detected at the first timing during an on time Ton. When the output of an analog comparator 134 is inverted, that is, at the last timing during the on time Ton, the drain current (inductor current) Ip of the switching element Q1 or switching element Q2 is detected. The average value of the Ib and the Ip is obtained as the average value of the inductor current.

As shown in FIG. 6, in a case where the same method as in the second preferred embodiment is used, when the output of the analog comparator 134 is inverted, that is, at the first timing during an off time Toff, the drain Ip of the switching element Q1 or switching element Q2 is detected, and the average value of the inductor current is obtained by Formula (2).

In the example shown in FIGS. 7 and 8A-8D, the inductor L1 is connected between the connection between the diode D1 and the switching element Q1 and the first input terminal P11 of the alternating-current power supply. Another inductor may be connected between the connection between the diode D2 and the switching element Q2 and the second input terminal P12 of the alternating-current power supply.

In the preferred embodiments described above, the portion other than an analog circuit, the analog comparator 134, of the switching control circuit 13 may include a DSP (digital signal processor) or an FPGA (field programmable gate array).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power factor correction converter comprising:
a rectifier circuit that rectifies an alternating-current voltage received from an alternating-current power supply;
a series circuit that is connected to the subsequent stage of the rectifier circuit and includes an inductor and a switching element;
a rectifying and smoothing circuit connected to the switching element in parallel;
an input voltage detection circuit provided subsequent to the rectifier circuit;
an inductor current detection circuit that detects current flowing into the inductor;
an output voltage detection circuit provided subsequent to the rectifying and smoothing circuit;
a switching control circuit that on/off controls the switching element based on results of detection performed by the input voltage detection circuit, the inductor current detection circuit, and the output voltage detection circuit so that an input current received from the alternating-current power supply has a shape similar to a shape of the alternating-current voltage; and
an analog comparator that inverts an output thereof when an inductor current reaches a specified value after the switching element is turned on; wherein
the switching control circuit turns off the switching element when the output of the analog comparator is inverted, obtains an inductor current value at turn-on of the switching element by sampling, and obtains an average inductor current value by performing an operation based on an inductor current value at turn-off of the switching element determined by the specified value and the inductor current value at turn-on.

2. The power factor correction converter according to claim 1, wherein the switching control circuit comprises an A/D converter that converts detection signals of the input voltage detection circuit, the inductor current detection circuit, and the output voltage detection circuit into a digital value, a D/A converter that provides a reference voltage to the analog comparator, a PWM circuit that outputs a control voltage to the switching element, and a CPU that provides, to the D/A converter, the specified value corresponding to the reference value and obtains the average value of the inductor current based on the values converted by the A/D converter.

3. A power factor correction converter comprising:
a rectifier circuit that rectifies an alternating-current voltage received from an alternating-current power supply;
a series circuit that is connected to the subsequent stage of the rectifier circuit and includes an inductor and a switching element;
a rectifying and smoothing circuit connected to the switching element in parallel;
an input voltage detection circuit that is provided subsequent to the rectifier circuit and detects an input voltage;
an inductor current detection circuit that detects current flowing into the inductor;
an output voltage detection circuit that is provided subsequent to the rectifying and smoothing circuit and detects an output voltage;

a switching control circuit that on/off controls the switching element based on results of detection performed by the input voltage detection circuit, the inductor current detection circuit, and the output voltage detection circuit so that an input current received from the alternating-current power supply has a shape similar to a shape of the alternating-current voltage; and an analog comparator that detects that an inductor current has reached a specified value after the switching element is turned on; wherein the switching control circuit turns off the switching element when the output of the analog comparator is inverted, includes a timer that counts the time from turn-on of the switching element to turn-off thereof, detects an on time during which the switching element is on, from a count value of the timer or calculates an off time during which the switching element is off, and obtains an average inductor current value based on an inductor current value at turn-off of the switching element, the input voltage, the output voltage, inductance of the inductor, and one of the on time and the off time, the inductor current value at turn-off being determined by the specified value.

4. The power factor correction converter according to claim 3, wherein the switching control circuit comprises an A/D converter that converts detection signals of the input voltage detection circuit, the inductor current detection circuit, and the output voltage detection circuit into a digital value, a D/A converter that provides a reference voltage to the analog comparator, a PWM circuit that outputs a control voltage to the switching element, and a CPU that provides, to the D/A converter, the specified value corresponding to the reference value and obtains the average value of the inductor current based on the values converted by the A/D converter.

5. A power factor correction converter comprising:
a first series circuit that is connected to a load in parallel and includes a first switching element and a first rectifying element;
an inductor connected between the connection between the first switching element and the first rectifying element and a first input terminal of an alternating-current power supply;
a second series circuit that is connected to a load in parallel and includes a second switching element and a second rectifying element, a connection point between the second switching element and the second rectifying element being connected to a second input terminal of the alternating-current power supply;
a smoothing circuit connected to a load in parallel;
an inductor current detection circuit that detects current flowing into the inductor;
a switching control circuit that on/off controls the first and second switching elements so that an average value of an input current received from the alternating-current power supply has a shape similar to a shape of an alternating-current voltage of the alternating-current power supply; and
an analog comparator that inverts an output thereof when an inductor current reaches a specified value after one of the first and second switching elements is turned on; wherein the switching control circuit turns off one of the first and second switching elements when the output of the analog comparator is inverted, obtains an inductor current value at turn-on of one of the first and second switching elements by sampling, and obtains an average inductor current value by performing an operation based on an inductor current value at turn-off of the switching element determined by the specified value and the inductor current value at turn-on.

6. The power factor correction converter according to claim 5, wherein the switching control circuit comprises an A/D converter that converts detection signals of the input voltage detection circuit, the inductor current detection circuit, and the output voltage detection circuit into a digital value, a D/A converter that provides a reference voltage to the analog comparator, a PWM circuit that outputs a control voltage to the switching element, and a CPU that provides, to the D/A converter, the specified value corresponding to the reference value and obtains the average value of the inductor current on based on the values converted by the A/D converter.

7. A power factor correction converter comprising:
a first series circuit that is connected to a load in parallel and includes a first switching element and a first rectifying element;
an inductor connected between a connection point between the first switching element and the first rectifying element and a first input terminal of an alternating-current power supply;
a second series circuit that is connected to a load in parallel and includes a second switching element and a second rectifying element, a connection point between the second switching element and the second rectifying element being connected to a second input terminal of the alternating-current power supply;
a smoothing circuit connected to a load in parallel;
an input voltage detection circuit that detects an input voltage;
an output voltage detection circuit that is provided subsequent to the smoothing circuit and detects an output voltage;
an inductor current detection circuit that detects current flowing into the inductor;
a switching control circuit that on/off controls the first and second switching elements so that an average value of an input current received from the alternating-current power supply has a shape similar to a shape of an alternating-current voltage of the alternating-current power supply; and
an analog comparator that detects that an inductor current has reached a specified value after one of the first and second switching elements is turned on; wherein the switching control circuit turns off the switching element when the output of the analog comparator is inverted, includes a timer that counts the time from turn-on of the switching element to turn-off thereof, detects an on time during which the switching element is on, from a count value of the timer or calculates an off time during which the switching element is off, and obtains an average inductor current value based on an inductor current value at turn-off of the switching element, the input voltage, the output voltage, inductance of the inductor, and one of the on time and the off time, the inductor current value at turn-off being determined by the specified value.

8. The power factor correction converter according to claim 7, wherein the switching control circuit comprises an A/D converter that converts detection signals of the input voltage detection circuit, the inductor current detection circuit, and the output voltage detection circuit into a digital value, a D/A converter that provides a reference voltage to the analog comparator, a PWM circuit that outputs a control voltage to the switching element, and a CPU that provides, to the D/A converter, the specified value corresponding to the reference value and obtains the average value of the inductor current based on the values converted by the A/D converter.

* * * * *